United States Patent
Whitehead

(10) Patent No.: US 8,991,896 B1
(45) Date of Patent: Mar. 31, 2015

(54) COLLAPSIBLE HARD TOP FOR SPORT UTILITY VEHICLE

(75) Inventor: Andrew Patrick Whitehead, Dallas, TX (US)

(73) Assignee: Mechanical Holdings, LLC, Dallas, TX (US)

( * ) Notice: Subject to any disclaimer, the term of this patent is extended or adjusted under 35 U.S.C. 154(b) by 147 days.

(21) Appl. No.: 13/566,748

(22) Filed: Aug. 3, 2012

Related U.S. Application Data

(60) Provisional application No. 61/515,658, filed on Aug. 5, 2011.

(51) Int. Cl.
*B60J 7/08* (2006.01)
*B60J 7/10* (2006.01)
*B60J 7/19* (2006.01)
*B60J 7/16* (2006.01)

(52) U.S. Cl.
CPC *B60J 7/106* (2013.01); *B60J 7/196* (2013.01); *B60J 7/1664* (2013.01)
USPC .......................................................... 296/121

(58) Field of Classification Search
CPC ............... B60J 7/08; B60J 7/10; B60J 7/106; B60J 7/11; B62D 63/04; B62D 65/06
USPC ......... 296/121, 37.7, 37.8, 37.13, 37.16, 102, 296/106, 107.01, 107.03, 107.07, 120.1, 296/136.01, 136.03, 136.04, 136.05, 296/136.06, 136.07, 218, 224; 160/113, 160/115, 117, 119, 236, 369; 280/756
See application file for complete search history.

(56) References Cited

U.S. PATENT DOCUMENTS

| | | | | |
|---|---|---|---|---|
| 1,242,673 | A | * | 10/1917 | Fisher ........................... 296/103 |
| 1,688,867 | A | * | 10/1928 | Heintz .......................... 296/210 |
| 3,774,959 | A | * | 11/1973 | Brudy ........................... 296/121 |
| D268,408 | S | | 3/1983 | Ruggles |
| 4,799,726 | A | * | 1/1989 | Scott ........................ 296/100.09 |
| 4,821,394 | A | * | 4/1989 | Martinez-Vera ............. 29/401.1 |
| 5,002,002 | A | * | 3/1991 | Awalt, Jr. ...................... 114/210 |
| 5,033,788 | A | | 7/1991 | Raj |
| 5,042,379 | A | * | 8/1991 | Greer ............................ 101/216 |
| 5,094,316 | A | * | 3/1992 | Rosen ........................... 181/141 |
| 5,193,874 | A | * | 3/1993 | German et al. .............. 296/37.1 |
| 5,314,225 | A | | 5/1994 | Gordon |
| 5,738,405 | A | | 4/1998 | Richters et al. |
| 5,947,546 | A | * | 9/1999 | Hilliard et al. ........... 296/107.11 |

(Continued)

FOREIGN PATENT DOCUMENTS

| | | | | |
|---|---|---|---|---|
| DE | 1680205 | * | 1/1968 | ................. B60J 7/10 |
| DE | 3401965 | A1 * | 7/1985 | ................. B60J 7/10 |

(Continued)

*Primary Examiner* — Glenn Dayoan
*Assistant Examiner* — Paul Chenevert
(74) *Attorney, Agent, or Firm* — Hemingway & Hansen LLP; D. Scott Hemingway

(57) ABSTRACT

A removable hard top system for a convertible sport utility vehicle is described. The system comprises an adapter kit which is installed onto a vehicle and which remains in place on a semi-permanent basis. The system further comprises a removable hard top assembly which disassembles into component parts that may be fully stored in the vehicle to allow the user to install the hard top assembly on the vehicle at a time and place either at or remote from the home base of the vehicle. The system is modular so that the user can customize the coverage desired.

22 Claims, 18 Drawing Sheets

(56) References Cited

U.S. PATENT DOCUMENTS

| | | | |
|---|---|---|---|
| 5,979,969 A | 11/1999 | Hilliard et al. | |
| 5,992,917 A | 11/1999 | Hilliard et al. | |
| 6,010,176 A * | 1/2000 | Jones | 296/100.16 |
| 6,309,007 B1 * | 10/2001 | Essig et al. | 296/103 |
| 6,497,351 B1 * | 12/2002 | Peele, Jr. | 224/563 |
| 6,851,739 B2 | 2/2005 | Morley | |
| 6,902,222 B2 * | 6/2005 | Nykiel et al. | 296/100.02 |
| 6,921,077 B1 | 7/2005 | Pupo | |
| 7,240,960 B2 | 7/2007 | Fallis, III et al. | |
| 7,469,954 B2 * | 12/2008 | Fallis et al. | 296/107.09 |
| 7,523,977 B2 | 4/2009 | Fallis, III et al. | |
| 8,408,623 B1 * | 4/2013 | McAuliff | 296/24.33 |
| 8,622,457 B1 * | 1/2014 | McIntire | 296/102 |
| 2003/0168880 A1 * | 9/2003 | Burkel et al. | 296/103 |
| 2005/0001446 A1 | 1/2005 | Morley | |
| 2005/0073179 A1 * | 4/2005 | Williams | 296/218 |
| 2005/0134096 A1 | 6/2005 | Fallis et al. | |
| 2007/0257521 A1 | 11/2007 | Fallis et al. | |
| 2008/0067830 A1 * | 3/2008 | Frankham | 296/100.02 |

FOREIGN PATENT DOCUMENTS

| | | | | |
|---|---|---|---|---|
| FR | 958347 A | * | 3/1950 | B60J 7/08 |
| FR | 2597822 A1 | * | 10/1987 | B60J 7/10 |
| FR | 2811266 A1 | * | 1/2002 | B60J 7/10 |
| GB | 2099377 A | * | 12/1982 | B60J 7/10 |
| GB | 2304647 A | * | 3/1997 | B60J 7/10 |
| JP | 2981947 | * | 9/1999 | B60J 7/10 |
| WO | WO 0214096 A2 | * | 2/2002 | B60J 7/10 |
| WO | WO 2009067775 A1 | * | 6/2009 | B60J 7/10 |

* cited by examiner

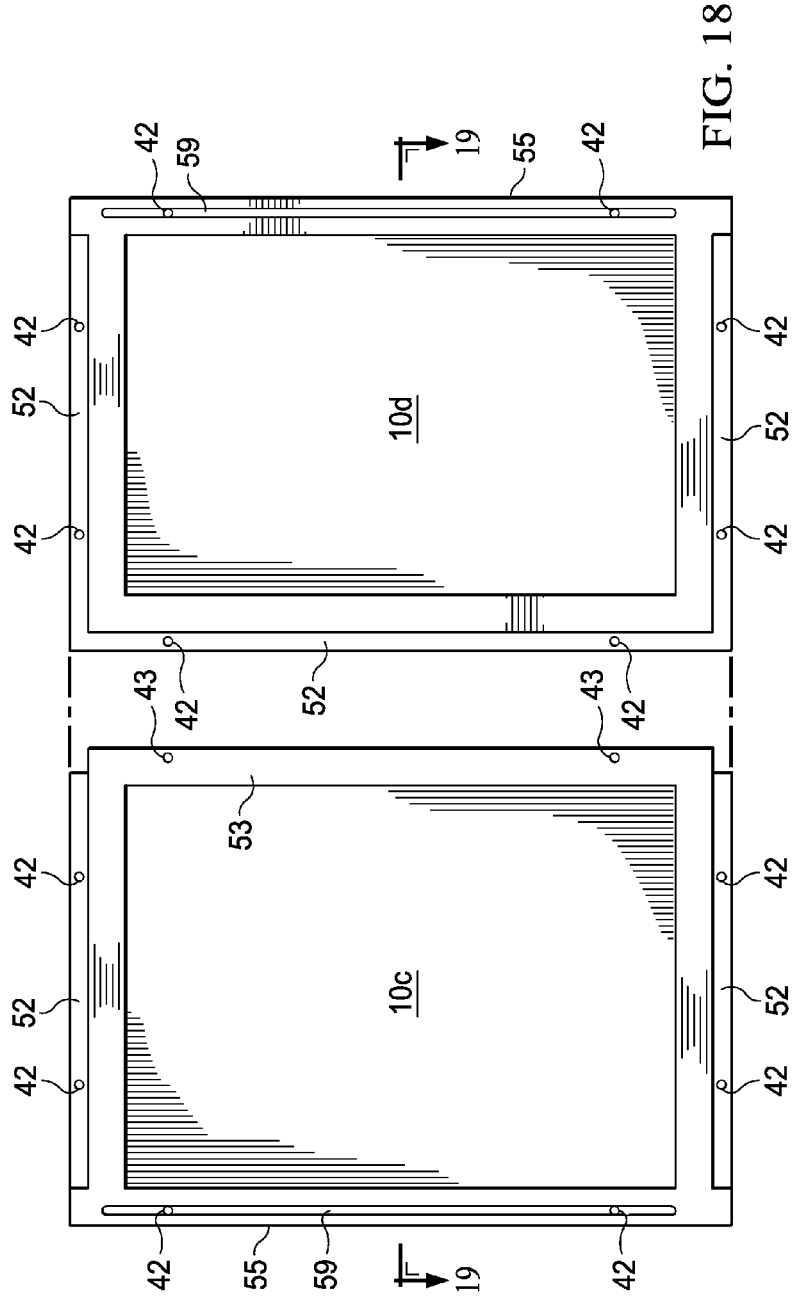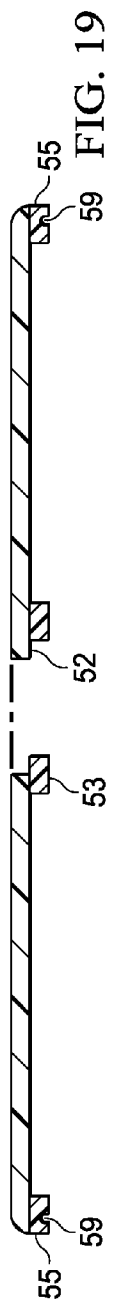

COLLAPSIBLE HARD TOP FOR SPORT UTILITY VEHICLE

CROSS REFERENCE TO RELATED APPLICATIONS

This application claims the benefit of U.S. Provisional Application No. 61/515,658, filed Aug. 5, 2011.

STATEMENT REGARDING FEDERALLY SPONSORED RESEARCH OR DEVELOPMENT

Not applicable.

TECHNICAL FIELD OF INVENTION

The present invention is directed to convertible hard tops for sport utility vehicles.

BACKGROUND OF THE INVENTION

Convertible sport utility vehicles provide the owner with the option to use the vehicle with or without a removable hard top. However, the decision as to whether to use the hard top often has to be made before the driver of the vehicle leaves the location where the removed top is stored, usually their home, because of the size and configuration of the hard top. The user must decide either to put the hardtop on the vehicle and to leave it on for the duration of the time the user is away from home base, or to remove the hard top and store it at the home base storage area. If circumstances arise at a location remote from the storage area making it desirable to install the hard top, the user is unable to do so because the vehicle and the hard top are at that point in time in two different locations. In addition, installation of hard tops generally requires more than one person.

BRIEF DESCRIPTION OF THE DRAWINGS

FIG. 13 is a perspective cross-section showing the attachment of the side panels of the removable hard top of the invention to the vehicle.

FIG. 18 is a bottom view of the top rear panels.

FIG. 19 is cross section view along the line 19-19 of FIG. 18.

DETAILED DESCRIPTION

A system for a convertible sport utility vehicle comprises a removable hard top assembly and an adapter kit. The adapter kit is to be pre-installed onto the vehicle as a semi-permanent addition to the vehicle. The removable hard top assembly may be temporarily installed onto the vehicle and to the pre-installed adapter kit when a hard top covering is desired, then disassembled and removed from the vehicle and the pre-installed adapter kit when a hard top covering is not desired. The removable hard top assembly, when disassembled and removed from the vehicle, is sufficiently compact to store in the vehicle. The fact that the disassembled hard top can be stored in the vehicle provides a great advantage as it allows a vehicle driver to quickly assemble and install a hard top on the vehicle when the vehicle is physically away from its home base. The hard top assembly can be easily installed by one person. The various parts of the removable hard top assembly when assembled are securely attached to the vehicle, and securely attached to other parts of the assembly, thus forming a road-safe, hard top to protect the occupants and cargo of the vehicle from inclement weather and flying road hazards.

Suitable vehicles for employment of the invention include vehicles which have integral roll bars. The roll bars are provided by the vehicle manufacturer with fastener holes. In a preferred embodiment, the hard top system is adapted to take advantage of the holes already provided by the vehicle manufacturer on vehicle roll bars, tub rails and/or other vehicle structures so that a user is not required to drill holes in the vehicle for installation of the adapter kit or hard top assembly of the invention. Thus, most often no special tools are needed to secure the adapter kit to the vehicle, although hand tools are advantageously employed to secure fasteners which secure the adapter kit to the vehicle body. In particular, the embodiment of the invention illustrated herein is most useful for employment with JEEP® brand Wranglers from 1997 to current (2011) models. However, the invention is adaptable to other vehicles as well. For vehicles that do not have pre-located holes corresponding to the fastener locations illustrated, the fastener locations can be changed to correspond with the vehicle's pre-located holes, or an installer may drill holes in the vehicle to line up with the fastener locations on the adapter kit/hard top assembly of the invention. The hard top assembly is adaptable to fit other vehicles. Modifications in the channel shape which engages the windshield of the vehicle or shapes of various hard top assembly pieces may be made prior to fabrication to accommodate differing vehicle characteristics.

Figure 1:
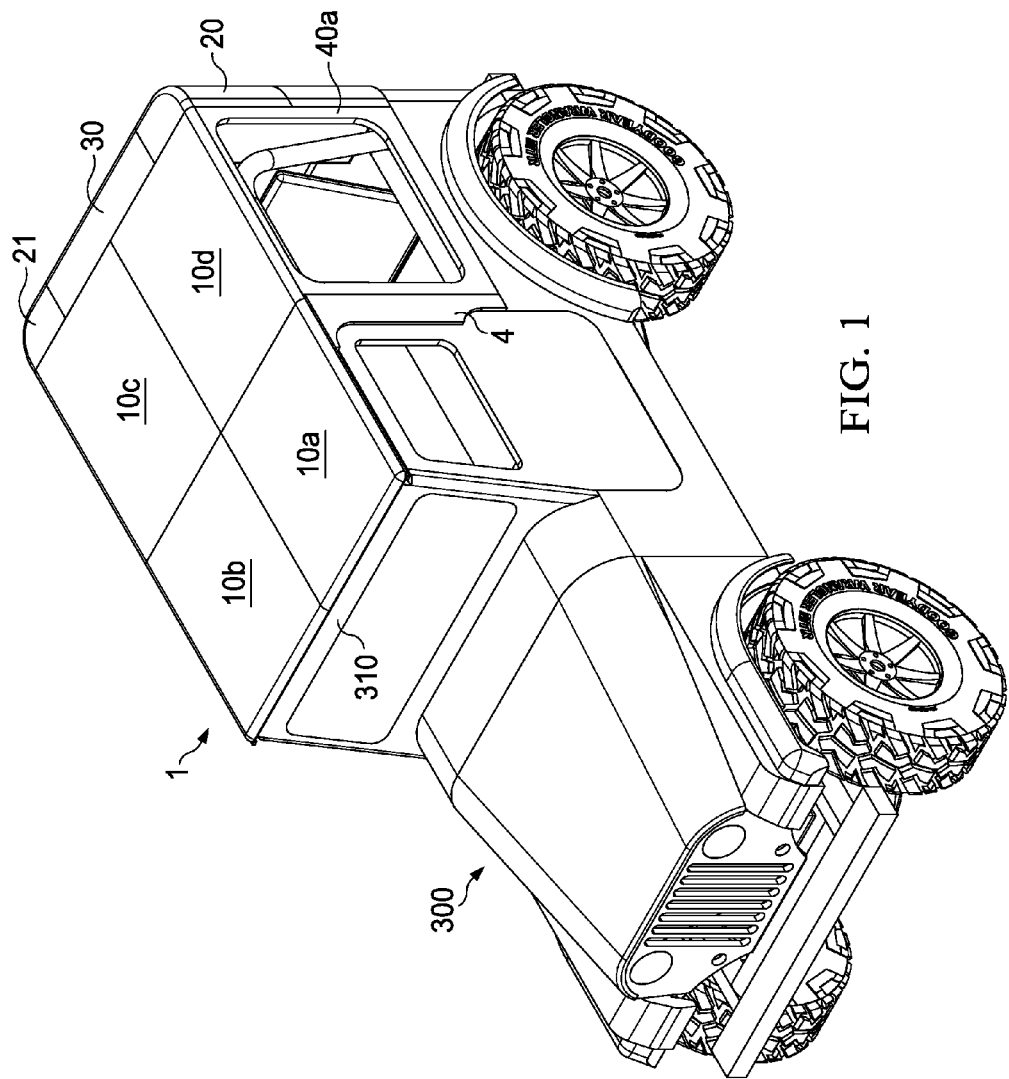
FIG. 1 is an environmental perspective view of a removable hard top of the invention as fully installed on a sport utility vehicle with all top panels in place.

Now referring to FIG. 1, which is an environmental perspective view of the assembled removable hardtop 1 of the invention as installed on a typical convertible sport utility vehicle, the invention as it may be employed for maximum coverage of the vehicle occupants and cargo is illustrated. Two top front panels 10a and 10b and two back panels 10c and 10d of the removable hardtop are secured to the vehicle 300. Top front driver panel 10a is secured to top front passenger panel 10b, cross member 6 (visible in FIG. 2), windshield 310 and left front member 2 (visible in FIG. 2); Top front passenger panel 10b is secured to top front driver panel 10a, cross member 6 (visible in FIG. 2), windshield 310 and right front member 3 (visible in FIG. 2); Top rear driver panel 10d is secured to cross member 6 (visible in FIG. 2), top rear passenger panel 10c, left side panel 40A, left cabinet 20 and rear cross piece 30; and top rear passenger panel 10c is secured to cross member 6 (visible in FIG. 2), top rear driver panel 10d, right side panel 40B (visible in FIG. 2), right cabinet 21 and rear cross piece 30.

Figure 2:
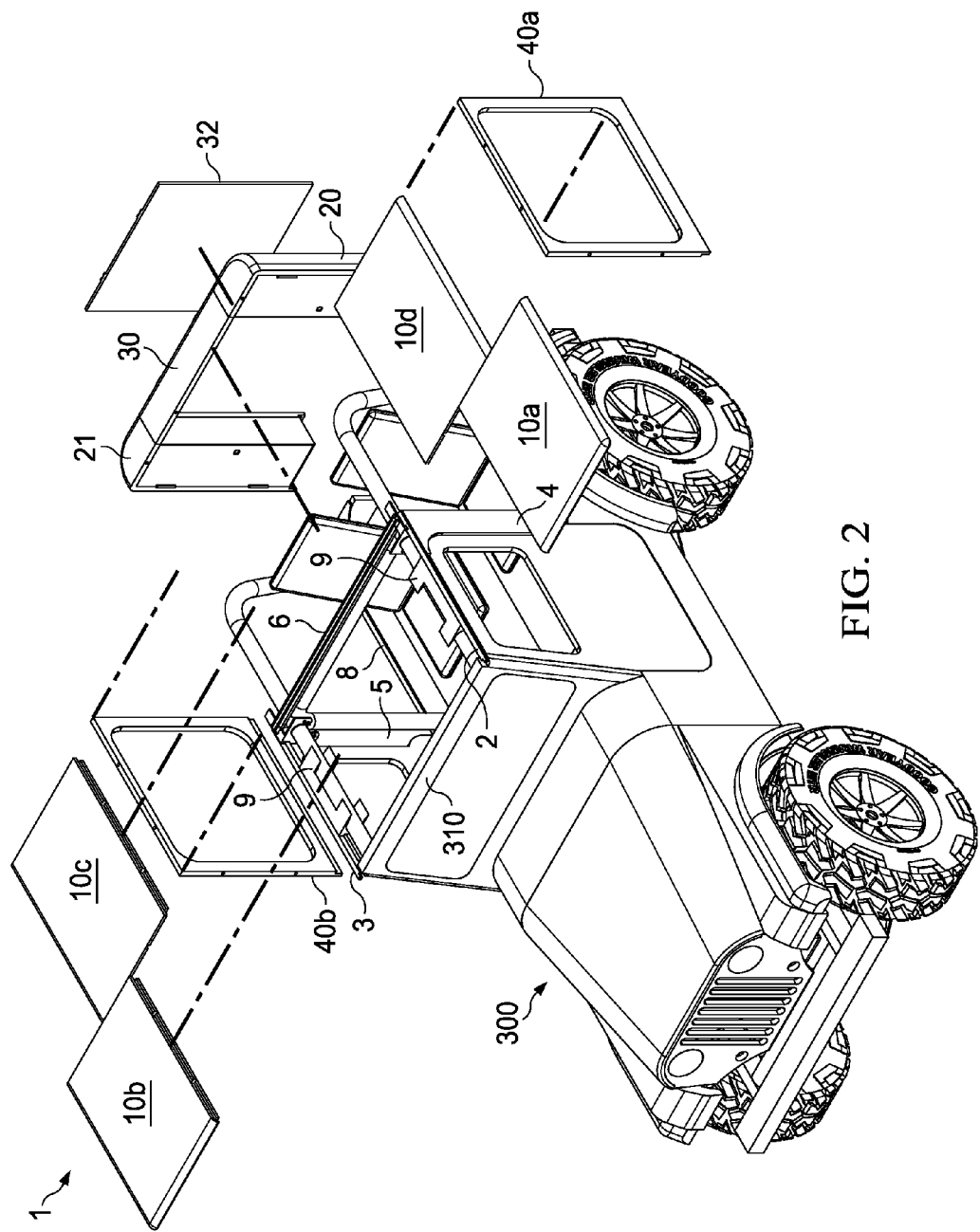
FIG. 2 is an environmental perspective exploded view of a removable hard top of the invention.
Figure 9:
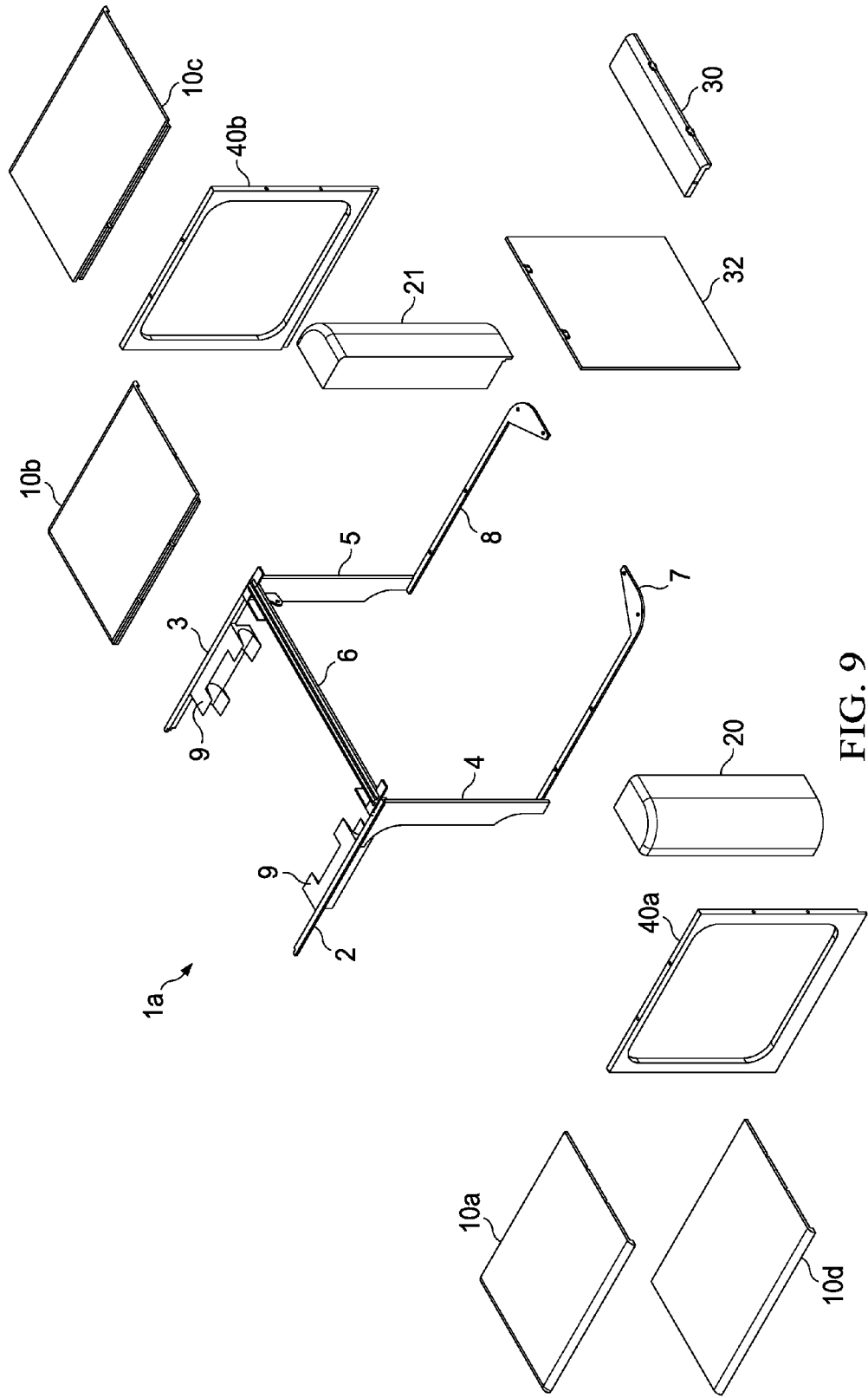
FIG. 9 is an exploded view illustrating the components of the removable hard top of the invention.
Figure 10:
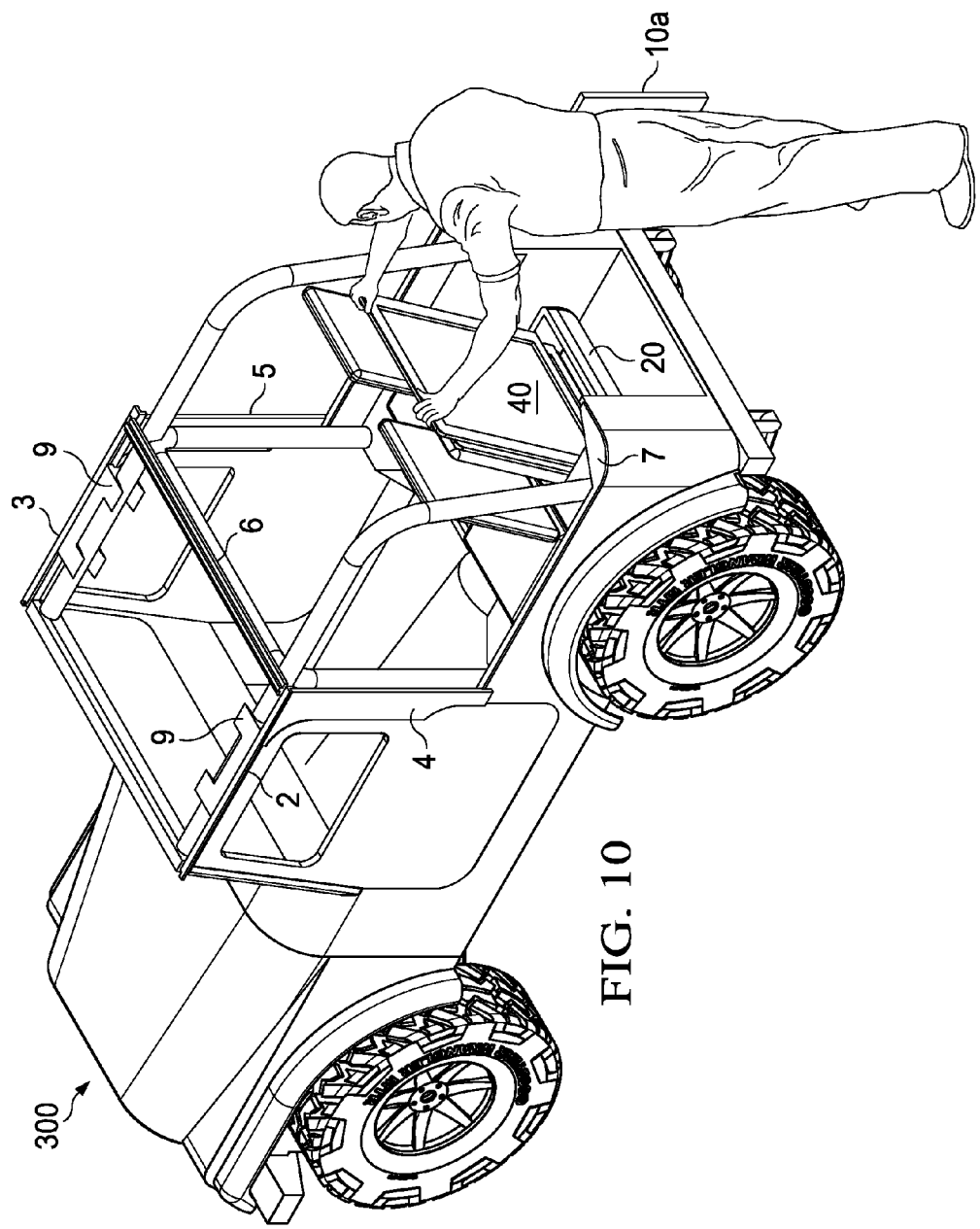
FIG. 10 is an environmental view illustrating a disassembled hard top assembly of the invention being fully stored by a user in the vehicle.
Figure 11:
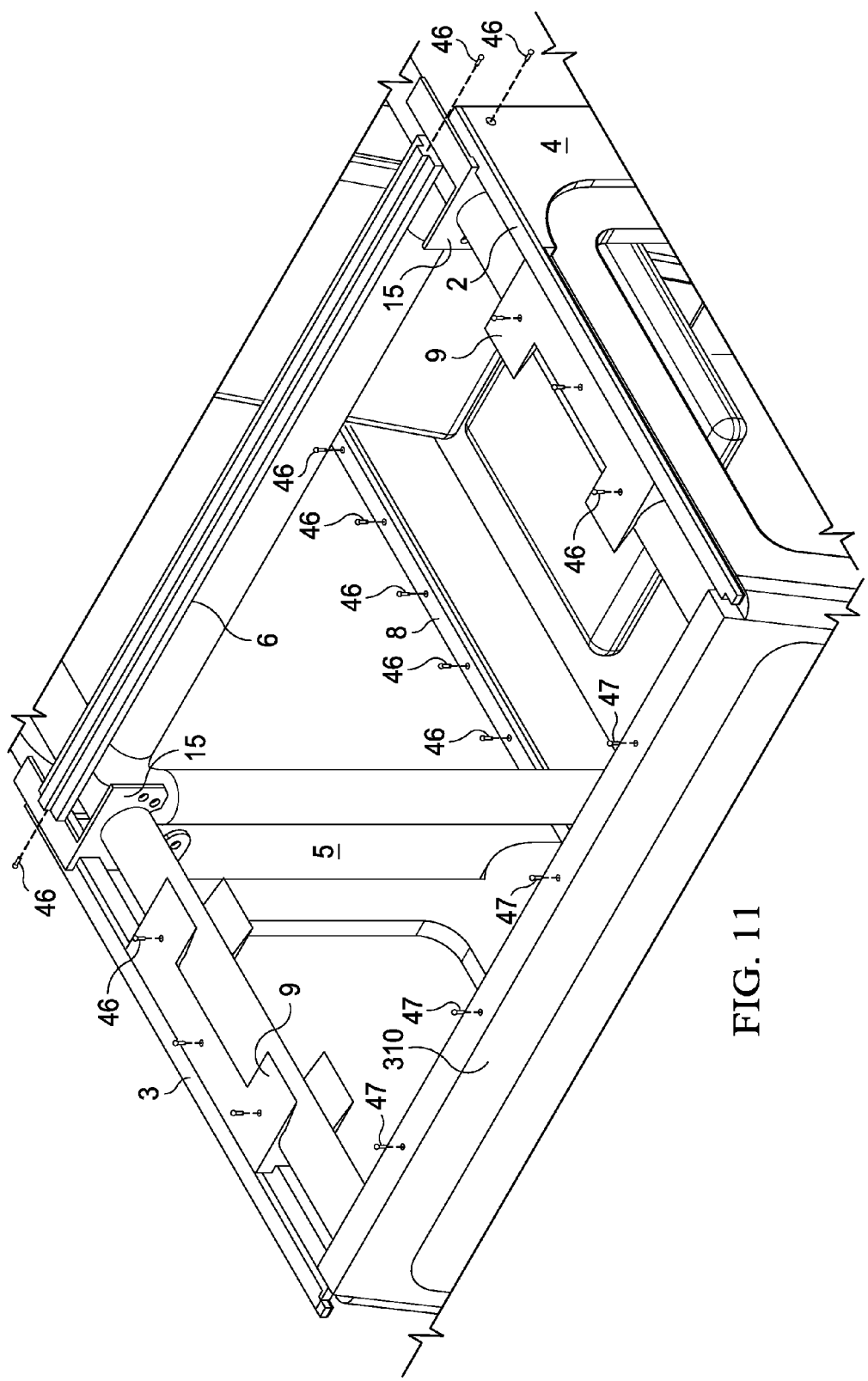
FIG. 11 is a perspective detailed top view of a front portion of a vehicle, illustrating adapter kit portions and fastening means.

FIG. 2, which is an environmental exploded view of the removable hardtop assembly of the invention, also reveals the adapter kit as installed on the vehicle. As best seen in FIG. 9, adapter kit 1a comprises left front member 2, right front member 3, left side member 4, cross member 6, right side member 5, left bottom member 7 and right bottom member 8. In FIGS. 2 and 10, the position of installed adapter kit 1a can best be seen. The adapter kit 1a is pre-installed on the vehicle and left in place as a semi-permanent installation. By semi-permanent it is meant that the adapter kit is installed and left on the vehicle as long as the user desires to have the option to quickly install and remove the removable hard top assembly of the invention. However, the adapter kit can be removed if the vehicle owner desires to do so. The adapter kit is most preferably provided with fastener holes which line up with fastener holes already provided by the vehicle manufacturer. These fastener holes are illustrated in FIGS. 9 and 11. Machine fasteners 46 of appropriate length to secure the adapter kit 1a to the vehicle are preferably provided with the adapter kit to be used in the installation onto the vehicle. FIG. 11 shows the detailed position of the fastener holes for installation of left side member 4 (and right side member 5 respectively) and left and right front members 2 and 3 to the vehicle. Brackets 9 are preferably integral to left and right front members 2 and 3 and are essentially "c" shaped and conform to the shape of a roll-bar of a convertible sport utility vehicle. They may be secured thereto with fasteners such as shown in FIG. 11. Fasteners may be screws, bolts or other fastening means appropriate to secure the parts together.

Figure 3:
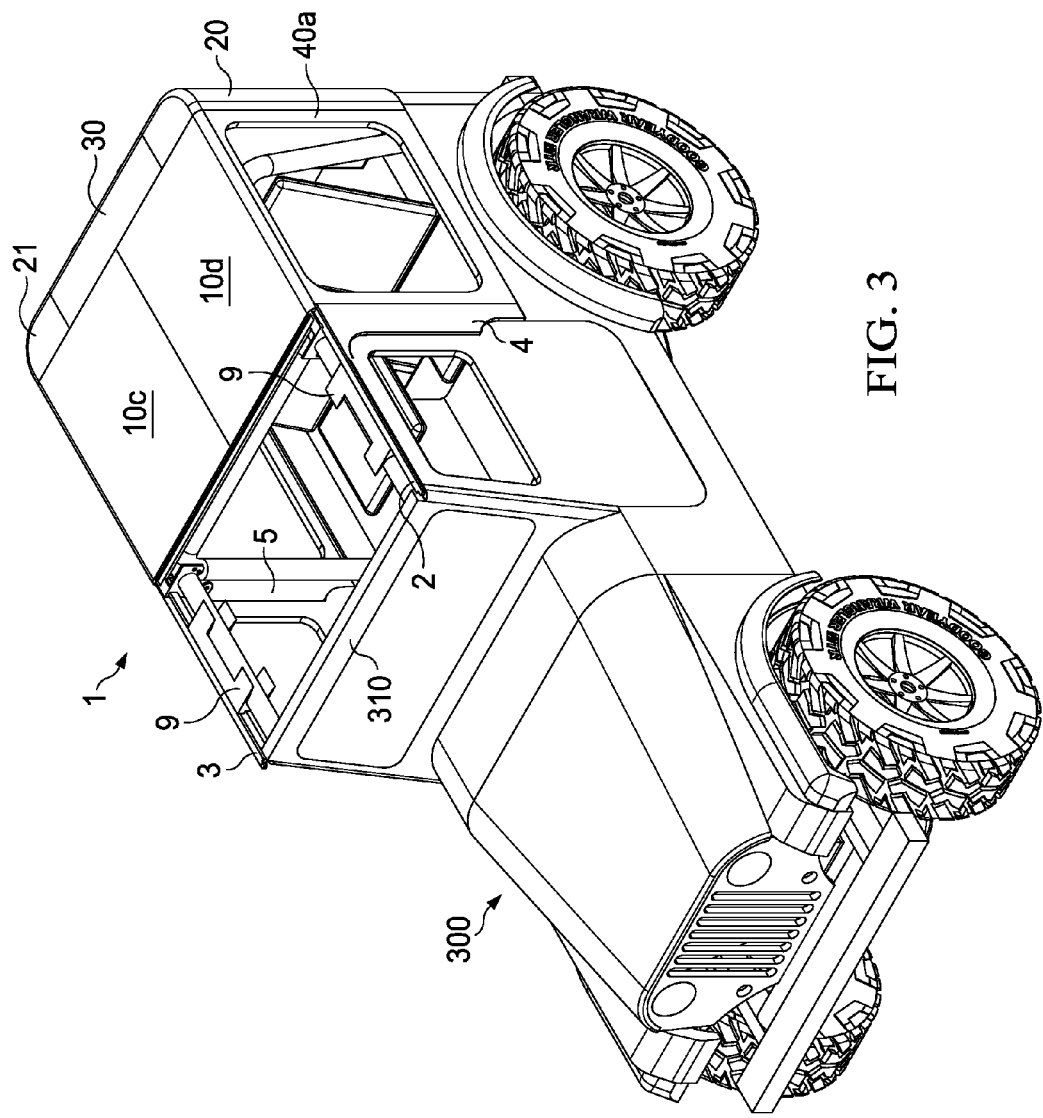
FIG. 3 is an environmental perspective view of a removable hard top of the invention with only back top panels installed.

FIG. 3 illustrates the modular nature of the removable hard top assembly in that only top rear panels 10c and 10d are installed in this environmental view, so that the driver and/or front passenger in the vehicle may continue to experience the open air, but back passengers and/or cargo may be covered and protected from wind, precipitation, and road dirt. This view exposes portions of the adapter kit, right side member 5 and left side member 4.

Figure 4:
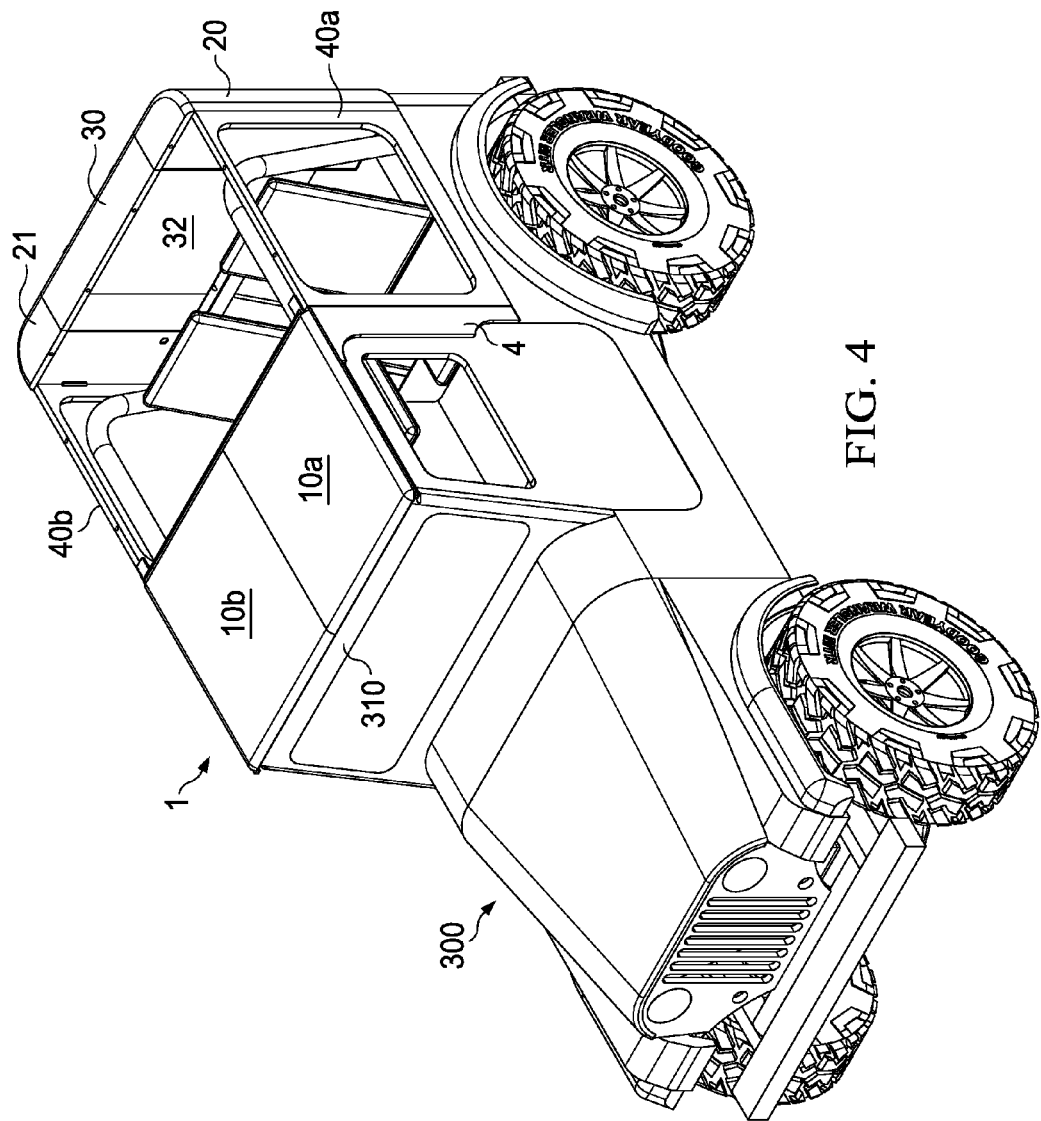
FIG. 4 is an environmental perspective view of a removable hard top of the invention with only front top panels installed.
Figure 12B:
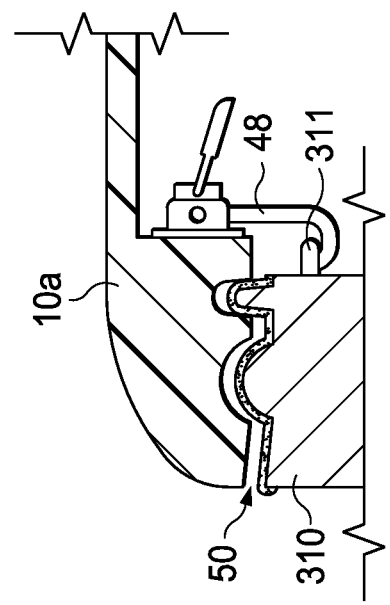
FIG. 12B is a cross-section (as indicated in FIG. 12A) of a panel of the removable hard top of the invention as secured to the vehicle.
Figure 15:
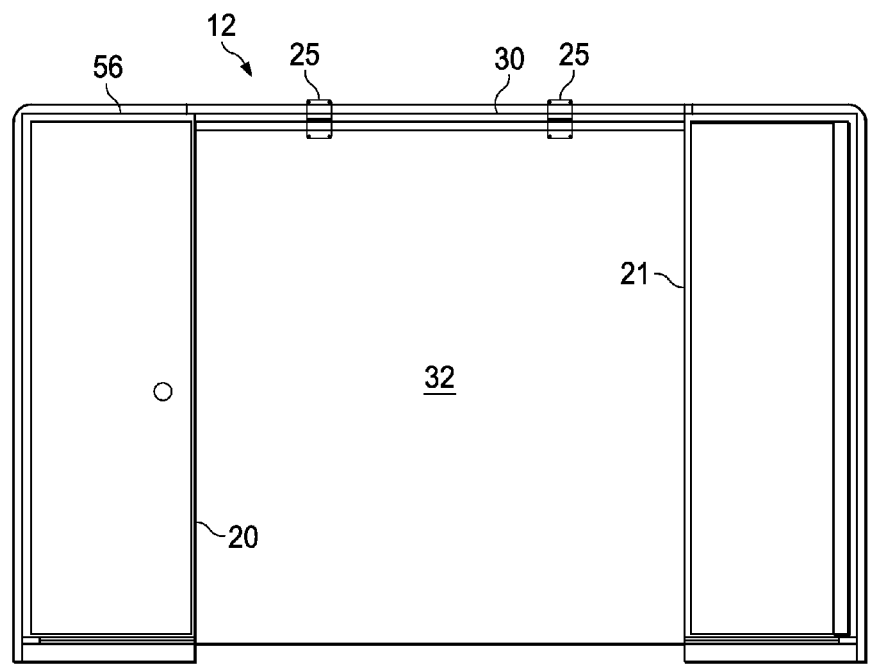
FIG. 15 is a plane front view of the rear assembly of the removable hard top.
Figure 17:
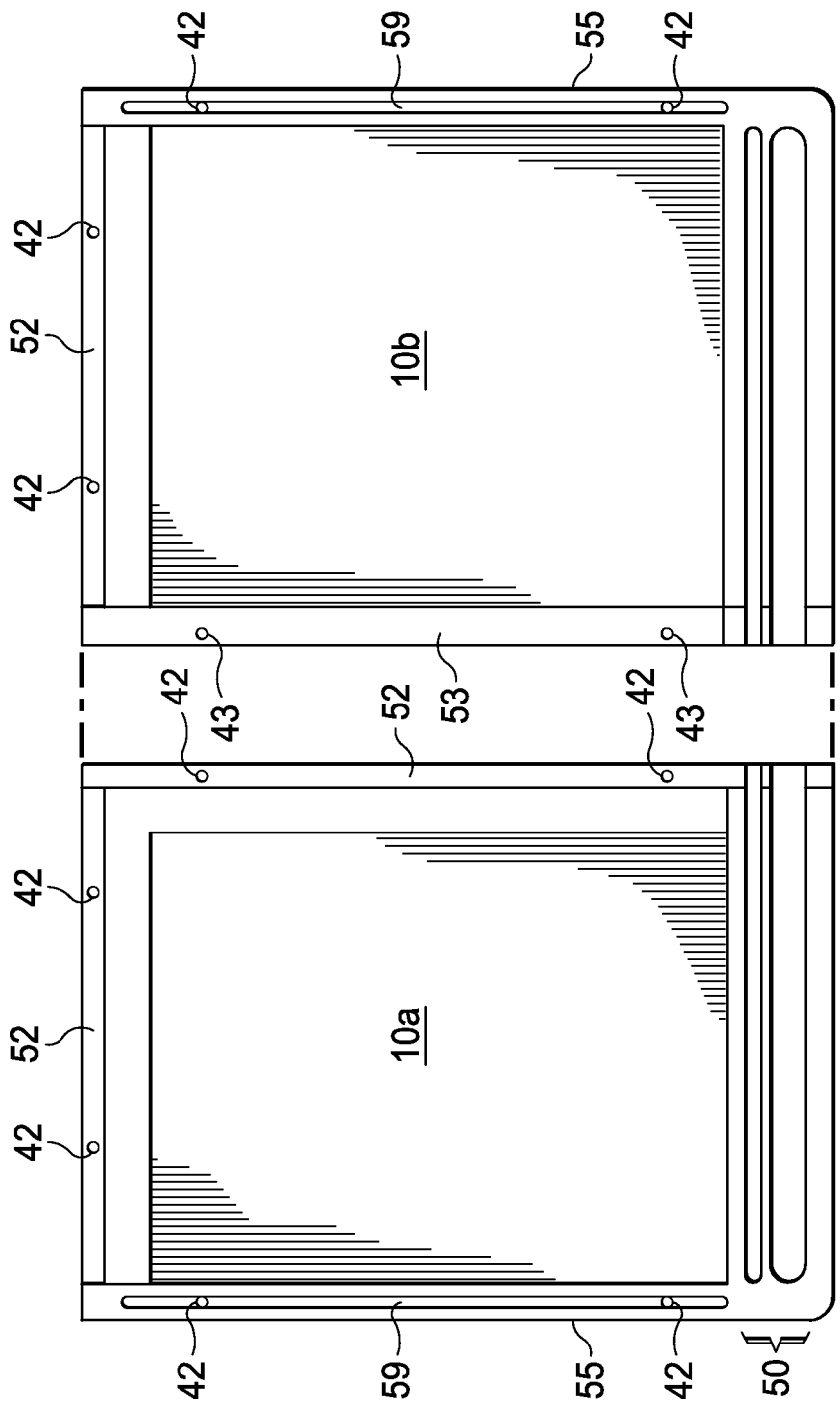
FIG. 17 is a bottom view of the top front panels.

FIG. 4 illustrates the modular nature of the removable hard top assembly in that only front panels 10a and 10b are installed in this environmental view, so that the driver and/or front passenger in the vehicle have an overhead cover, and the back seat passengers or cargo have side and rear protection from the employment of side panels 40a and 40b and rear panel 32. Additionally, the vehicle is equipped with additional storage from cabinets 20 and 21 due to the employment of rear assembly 12 (as best seen in FIG. 15). Rear assembly 12 includes left cabinet 20 and right cabinet 21, rear cross piece 30 and rear panel 32. Rear assembly 12 is also illustrated in FIGS. 1-8 and 15, 21 and 22. Front panels 10a and 10b are supported on the side of the vehicle by front side members 2 and 3 as seen in FIG. 3. Front panels 10a and 10b have a top side visible from the outside of the vehicle as installed and a bottom side. As best seen in FIGS. 12B and 17, the bottom side of 10a and also 10b defines a channel area 50. The channel area corresponds with the edge of windshield 310 of vehicle 300 and engages therewith.

Figure 5:
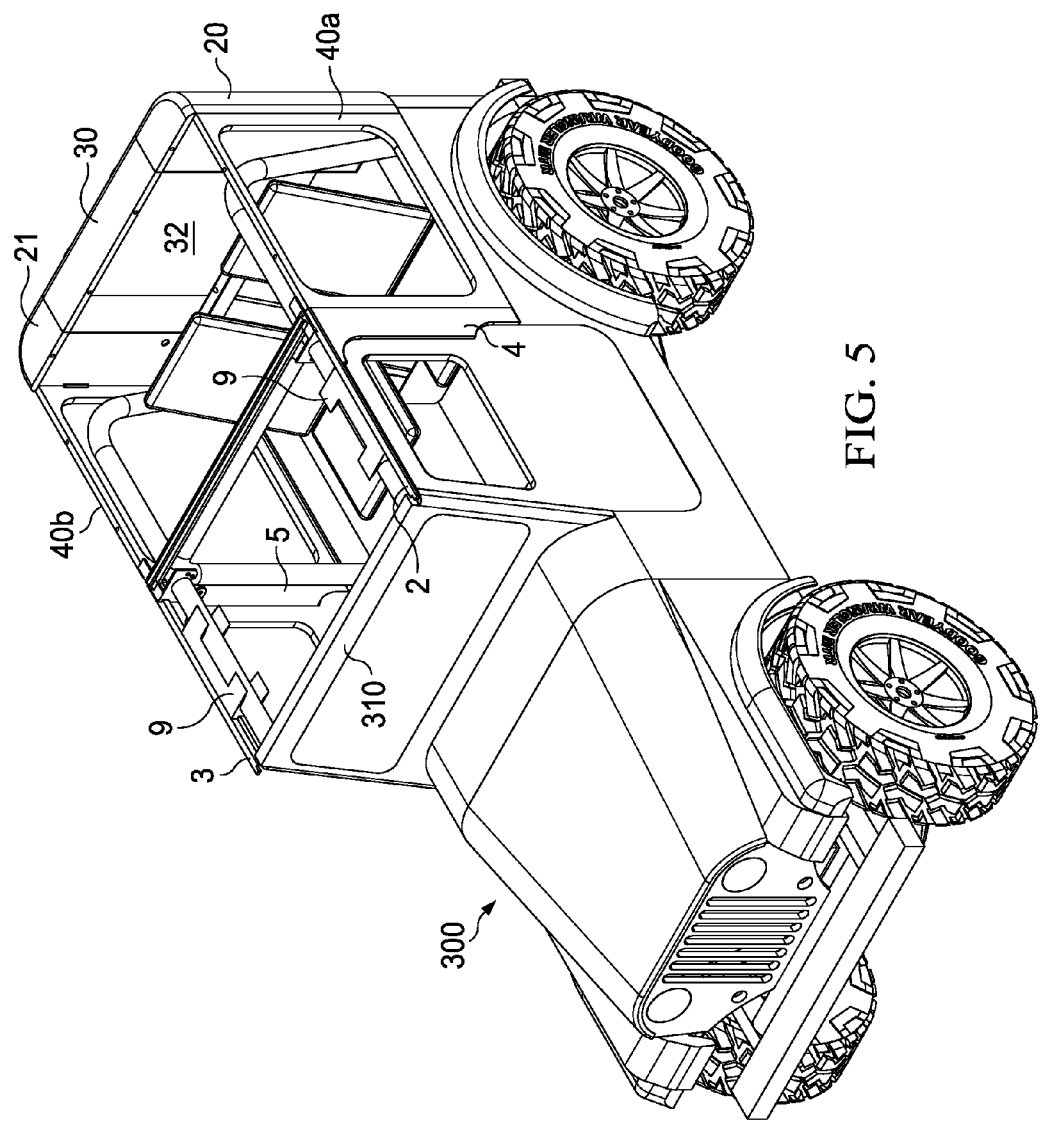
FIG. 5 is an environmental perspective view of the removable hard top of the invention with only side panels and the rear assembly in place.

FIG. 5 illustrates the modular nature of the removable hard top in that no top panels are employed, but side panels 40a and 40b are installed, as well as rear assembly 12. This allows the vehicle occupants to have an open air driving experience, but protects the back seat passengers/cargo from side and rear winds or blowing debris. The attachment of side window panels to the vehicle and adapter kit is detailed in FIG. 13 for side window panel 40b.

Additional configurations may include, but are not limited to, removing side panels 40a and 40b and rear panel 32 thus removing all hard top side windows, or only assembling top front panels 10a and 10b without side panels 40a and 40b and rear assembly 12 to provide shade for front driver and passenger.

Figure 6:
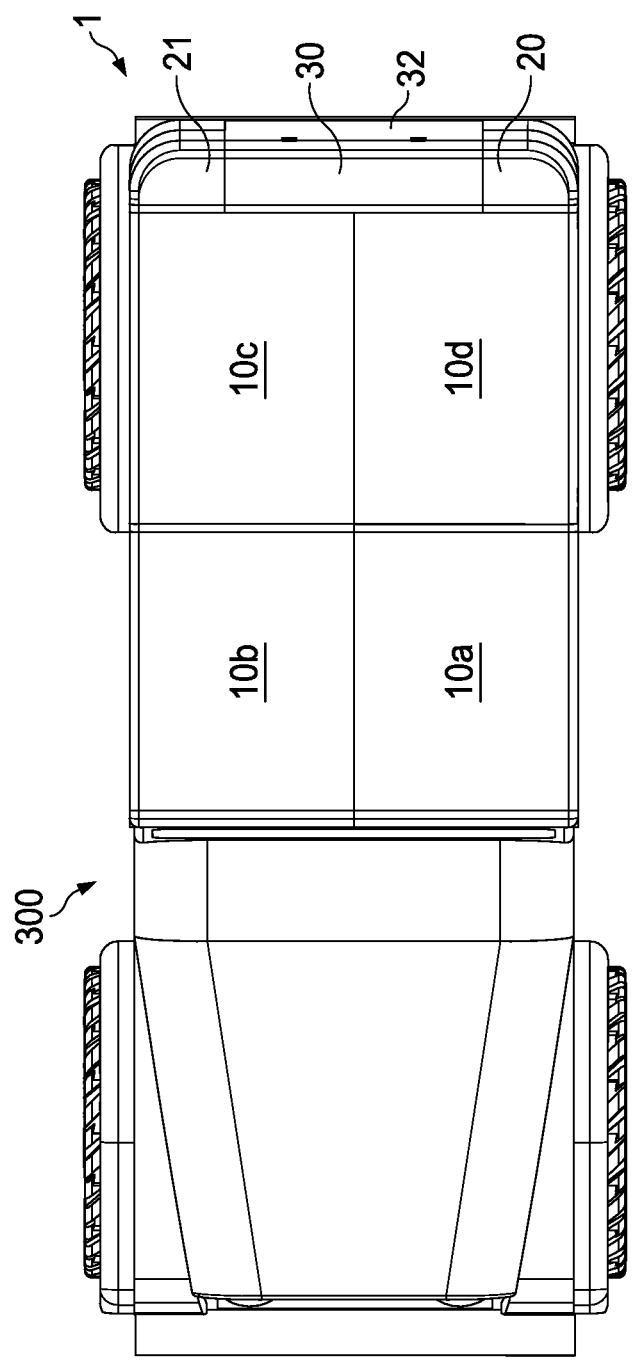
FIG. 6 is an environmental top view of a removable hard top of the invention as fully installed on a sport utility vehicle.

FIG. 6 is an environmental top view of the fully installed removable hard top assembly of the invention, illustrating the full coverage and protection of the occupants and cargo from weather and debris.

Figure 7:
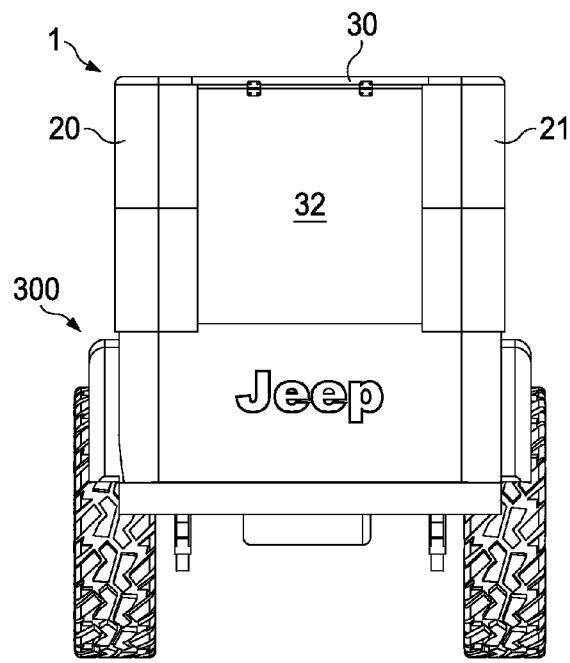
FIG. 7 is an environmental rear view of a removable hard top of the invention as installed on a sport utility vehicle.

FIG. 7 is a rear environmental view of installed rear assembly 12. Rear cross piece 30 connects left cabinet 20 and right cabinet 21 and rear panel 32. Both cabinets 20 and 21 connect to rear cross piece 30 by way of lap joint and lock pins. Rear panel 32 attaches to rear cross piece 30 with hinges 25 that may allow rear panel 32 to swing open proving access for a user to the inside of the vehicle. In another embodiment, cabinets 20 and 21 may have a hinge that allows the cabinets to fold in half and become smaller for storage. Another embodiment has hinges connecting the cabinets 20 and 21 to rear cross piece 30 allowing rear assembly 12 to remain as one piece but become more compact for storage.

Figure 8:
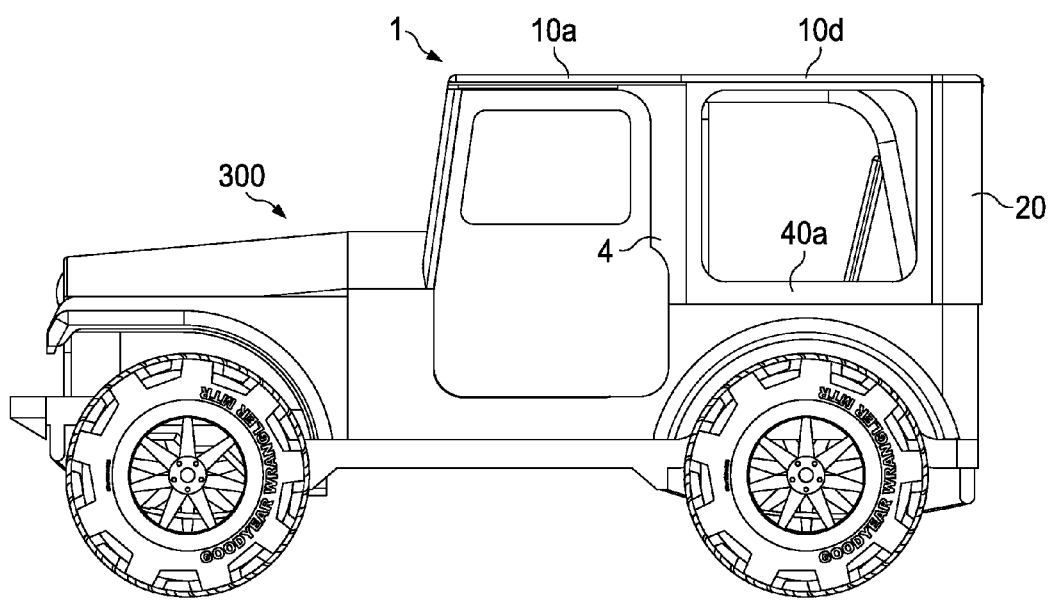
FIG. 8 is an environmental side view of a removable hard top of the invention as installed on a sport utility vehicle.

FIG. 8 is a side environmental view of fully installed removable hard top assembly of the invention.

Figure 13B:
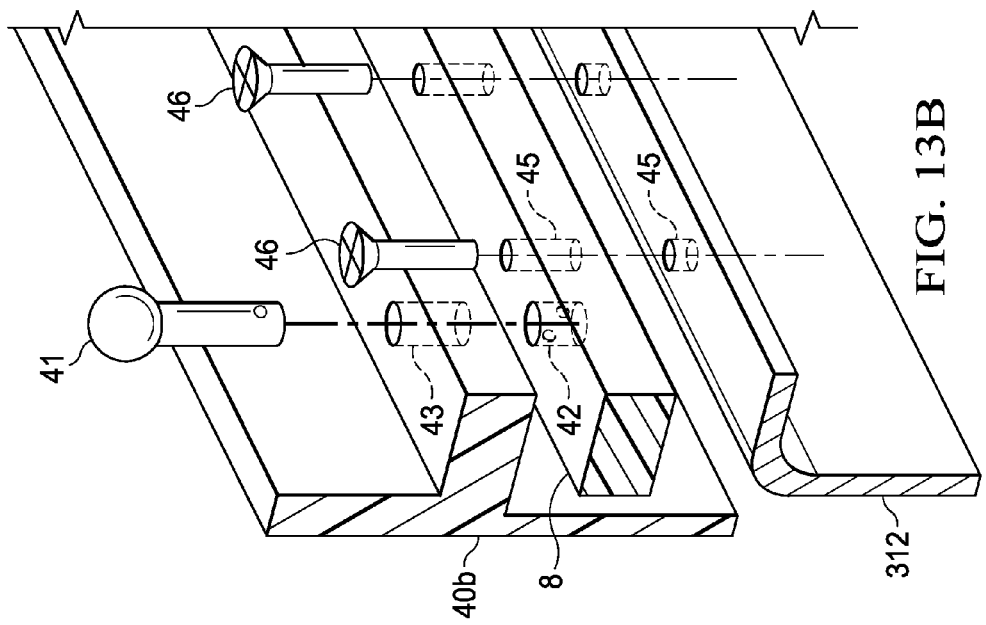
FIG. 13B is a cross-section (As indicated in FIG. 13A) of the attachment of the side panels of the removable hard top of the invention to the vehicle.

FIG. 9 illustrates a kit comprising the removable hard top assembly components and adapter kit components (after assembly thereof). FIG. 9 depicts the kit pieces only. Adapter kit 1a has been drawn to illustrate the pieces in their semi-permanent places as if secured to the vehicle. The pieces of adapter kit 1a are secured to the vehicle individually and not as a single structure as shown. Adapter kit 1a is intended to remain on the vehicle with only the hard top assembly components removably detachable. The adapter kit 1a comprises front members 2 and 3, side members 4 and 5, bottom members 7 and 8, and cross member 6. Hard top assembly components comprise top panels 10a, 10b, 10c and 10d, side panels 40a and 40b, cabinets 20 and 21, rear panel 32, and rear cross piece 30. Front members 2 and 3 are secured to the roll cage nearest vehicle driver and passenger doors with bracket_clamps 9 and fasteners 46. Cross member 6 is secured across the cross rail of the roll cage by the roll cage brackets 15 and fasteners 46 (shown in FIG. 11). Side members 4 and 5 secure to the roll cage brackets 15 and bottom members 7 and 8. Bottom members 7 and 8 are secured by fasteners 46 to tub rail 312 as best seen in FIG. 13B. In another embodiment, the adapter kit is pre-installed by a vehicle manufacturer or dealer, and only the removable hard top assembly components are packaged together for optional purchase by a consumer.

FIG. 10 illustrates a user of the invention storing the full removable hard top assembly components in the vehicle. The ability to disassemble and store the components in the vehicle provides an enormous advantage in the field of hard tops for convertible sport utility vehicles because the invention allows for portability of the hard top and removal and/or reinstallation at any time and place desired.

FIG. 11 is a detailed view of the adapter kit components installed on the front half of the vehicle. Securement of components to vehicle has been described above with description of FIG. 9. Front fasteners or front lock pins 47 may be employed in some embodiments. However, as shown in FIG. 12B and described below, a clasp 48 may be attached to top panels 10a and 10b to assist in securing the top panels to windshield 310.

Figure 12A:
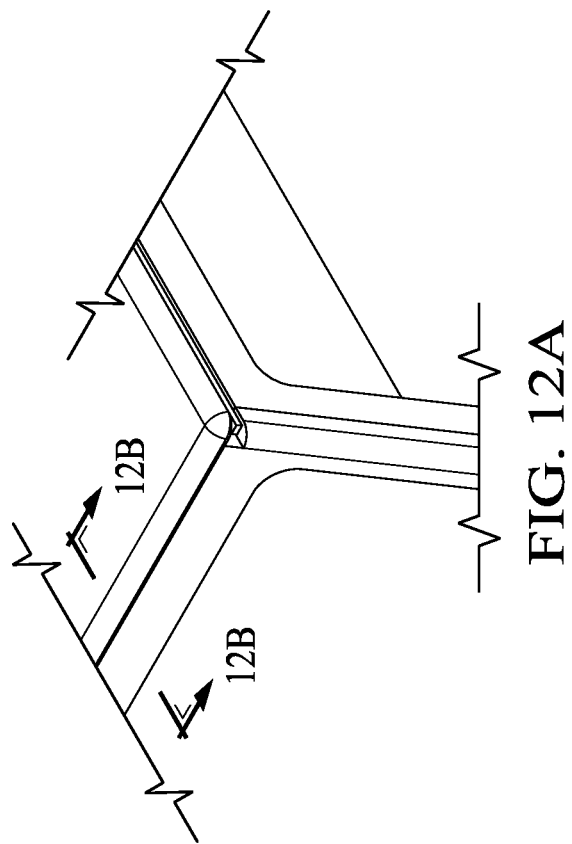
FIG. 12A is a perspective view of the driver side top front corner of a vehicle having a hard top assembly fully installed, with indications of a section which is illustrated in FIG. 12B.

FIG. 12A illustrates where the cross-section of FIG. 12B is taken. FIG. 12B demonstrates how top driver panel 10a and windshield 310 are secured. Top driver panel 10a (and top passenger panel 10b which is not shown here but can be readily envisioned) comprise a channel area 50 configured to accept long protrusions found along the top edge of windshield 310. The shape of the protrusions may differ depending on the model of vehicle. Preferably, the front edge of top panels 10a and 10b are shown secured to windshield 310 with a bracket or clasp 48 that connects to a factory windshield loop 311 or recess within the windshield frame. See also FIG. 17 below.

Figure 13A:
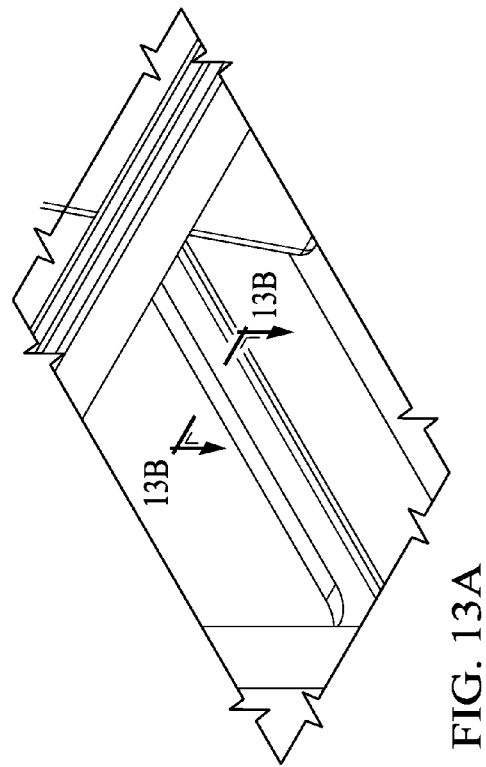
FIG. 13A is a perspective view of the right side window panel of a vehicle having a hard top assembly fully installed, with indications of a section which is illustrated in FIG. 13B.

FIG. 13A shows the location of a cross section illustrated in FIG. 13B. It can be appreciated that left side panel 40a attaches in a similar way (mirror image of that shown for 40b). As seen in FIG. 13B, right side panel 40b defines lock pin holes 43 adapted to receive locking pin(s) 41. Right bottom member 8 of the adapter kit comprises locking mechanisms 42 to which locking pin(s) 41 can be secured. Additionally, right bottom member 8 and tub rail 312 of vehicle 300 define fastener holes 45 that are adapted to receive a fastening means 46 such as a screw or bolt.

Figure 14B:
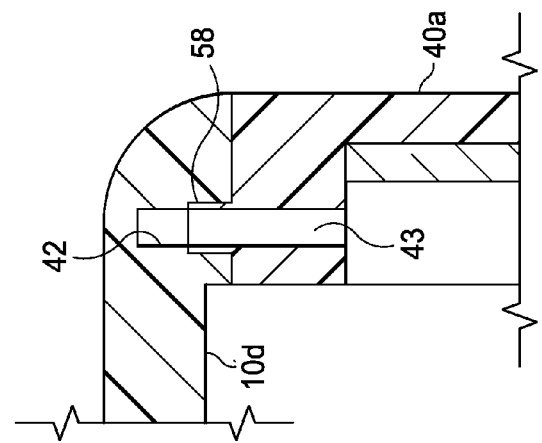
FIG. 14B is a cross-section along the lines indicated in FIG. 14A which illustrates a top rear panel connected to a side panel.
Figure 14A:
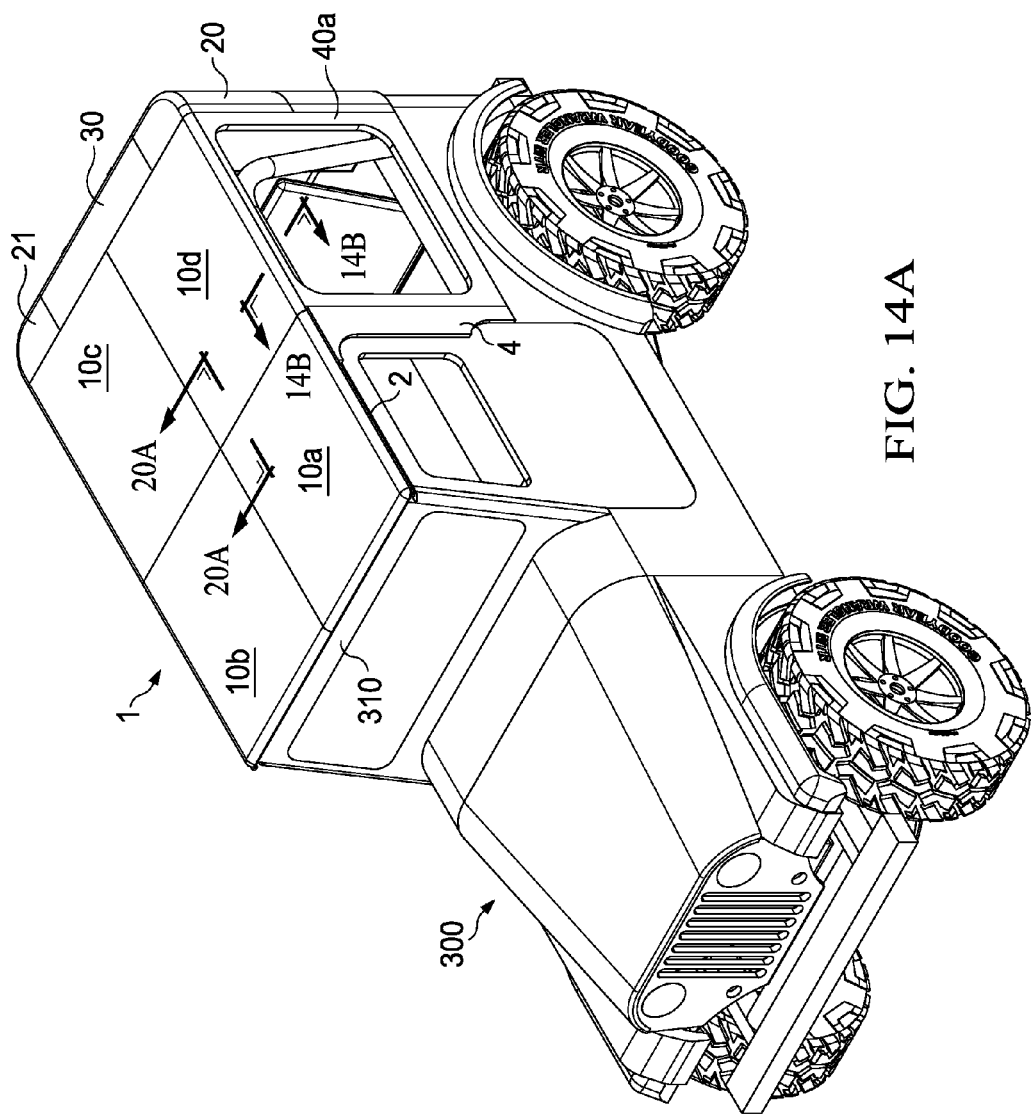
FIG. 14A is a perspective view of the removable hard top of the invention as secured to the vehicle with indications of a section which is illustrated in FIG. 14B.

FIG. 14A shows the location of a cross section illustrated in FIG. 14B. This shows the connection of top rear driver panel 10d and side panel 40a. Preferably side panel 40a has a raised edge 58 to compliment a channel 59 along the underside of outer edge of top rear driver panel 10d. Side panel 40a also has an inner side and an outer side. Along the inner side of side panel 40a are lock pin holes 43 which align with a lock pin mechanism 42 located in top rear driver panel 10d and allow a lock pin to be inserted thereby fastening the panels together. Side panel 40b and top rear passenger panel 10c secure to one another in a similar manner.

FIG. 15 shows rear assembly 12 as described in FIG. 7. Rear assembly lap 56 is a lap joint that compliments the lap joints of top panels 10c and 10d and side panels 40a and 40b. Hinges 25 are shown at the top of rear panel 32 where the panel attaches to rear cross piece 30.

Figure 16:
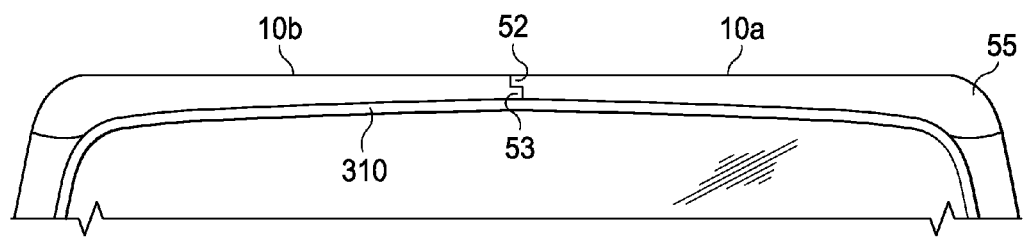
FIG. 16 is a front view illustrating how the front edge of top front panels is constructed to compliment the edge of the windshield.

FIG. 16 is a front view illustrating how the edge of top front panels (10a and 10b) is constructed to compliment the edge of the windshield. Panel upper lap 52 and panel lower lap 53 are illustrated.

FIG. 17 is a bottom view of the top front panels (10a and 10b). Channel area 50 is constructed to compliment the protrusions along the top edge of the factory windshield 310. Panel upper laps 52 lap over panel lower laps 53 and are secured together with lock pins through lock pin holes 43 and into lock pin mechanisms 42. Panel lateral edges 55 have a raised ridge channel 59 designed to accept raised ridge 58. Side panels 40a and 40b comprise a raised edge 58 along its top edge. Front members 2 and 3 also comprise a raised edge 58 along its top surface.

FIG. 18 is a bottom view of the top rear panels (10c and 10d). Top rear panels 10c and 10d are similarly constructed to top panels 10a and 10b without a channel area 50. Front and rear edges of top panels 10c and 10d are mirror images of each other.

The underside of all top panels may further comprise reinforcement ribs for added strength.

Additionally, top front panels 10a and 10b may be secured together with piano hinge, or by similar means, for easier assembly. The hinge may also help reduce road vibrations and/or leaks. Top rear panels 10c and 10d may also be secured together in a like manner.

FIG. 19 is a cross section view along the lines 19-19 of FIG. 18 to better view laps 52 and 53 and raised edge channel 59.

Figure 20A:
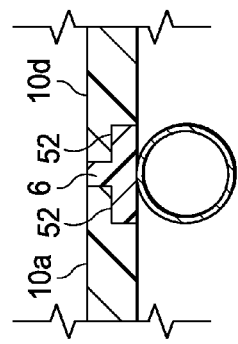
FIG. 20A is a cross section view along the line of 20A in FIG. 14A.
Figure 20B:
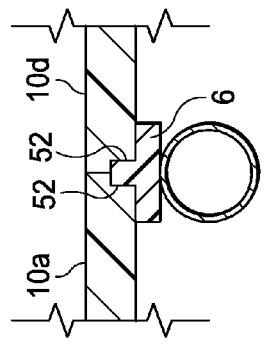
FIG. 20B is an alternative embodiment, taken along the same line as FIG. 20A with a variation to the lap joint of top panels 10*a* and 10*d*.

FIGS. 20A and 20B are cross section views along the lines 20A of FIG. 14A. FIG. 20a shows the bottom of top panels 10a and 10d coplanar with the bottom surface of cross member 6. FIG. 20B shows cross member 6 slightly below top panels 10a and 10d allowing top panels 10a and 10d to abut each other. Both ways are functional and may provide additional support to the weight of the panels or an enhanced seal to outside elements.

Figure 21:
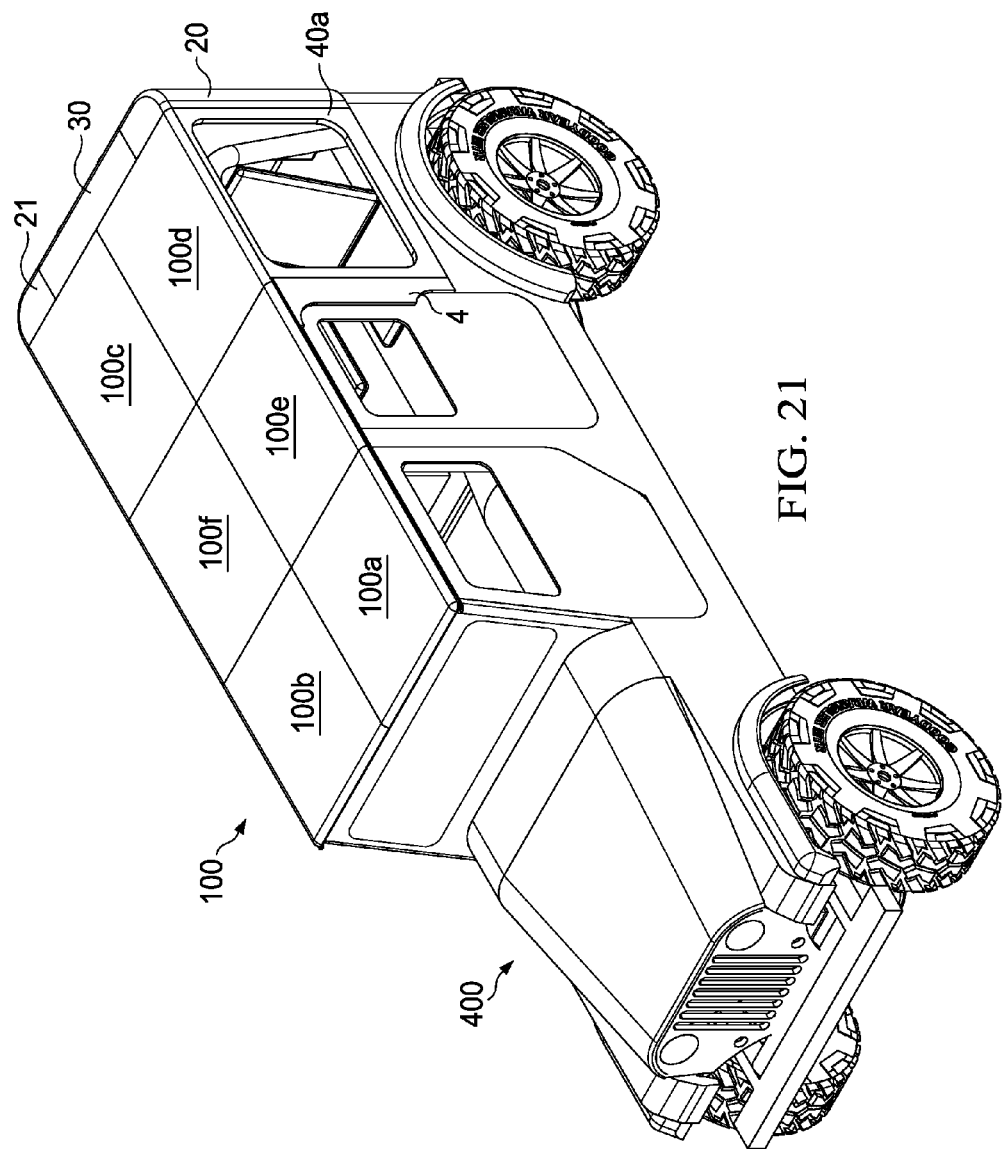
FIG. 21 is an environmental perspective view of an alternate embodiment of the removable hard top of the invention as secured to a larger vehicle, illustrating additional top panels.
Figure 22:
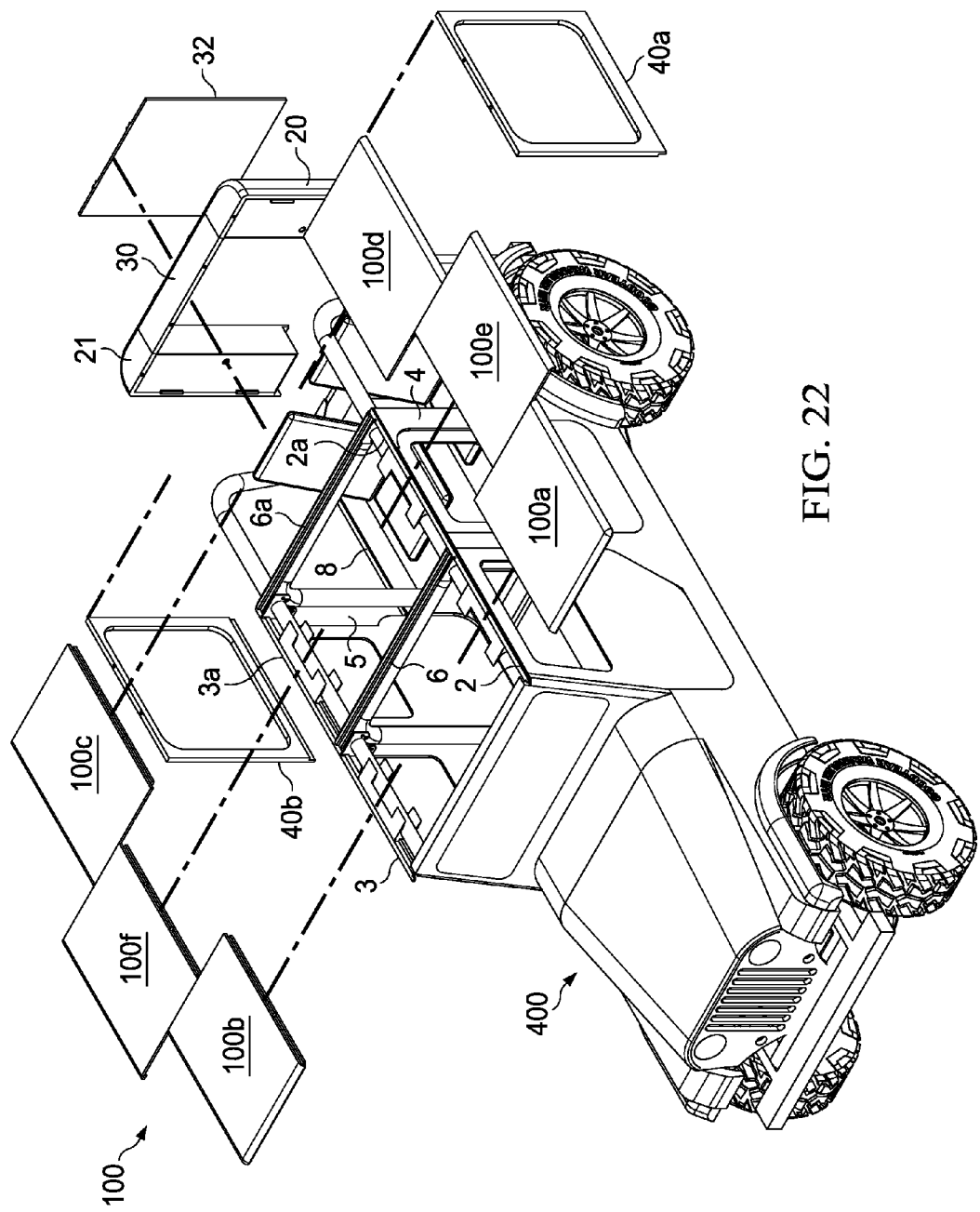
FIG. 22 is an environmental perspective exploded view of an alternate embodiment of the removable hard top of the invention.

FIG. 21 is an environmental perspective view of an alternative embodiment of the removable hard top assembly of the invention which has two additional top center panels 100e and 100f, an added left back member 2a and right back member 3a, and a secondary cross member 6a. The additional pieces are best seen in FIG. 22. This embodiment is appropriate for larger vehicles, such as the four door vehicle illustrated.

FIG. 22 is an environmental exploded perspective view of the alternative embodiment of the removable hard top assembly of the invention. Top front panels 100a and 100b and top rear panels 100c and 100d are similar in design to the top front and rear panels (10a through 10d) of the first described embodiment. Top center panels 100e and 100f are similar in design to top rear panels 100d and 100c respectively but slightly shorter in length. The difference in length is due to the varying distances between cross member 6 and secondary cross member 6a and between secondary cross member 6a and rear assembly 12. Left back member 2a is similar to left front member 2 and right back member 3a is similar to right front member 3. Left and right back members 2a and 3a are secured above the rear driver and passenger doors. Secondary cross member 6a is secured to the rear cross roll bar.

Another advantage to the disclosed invention is the ability to assemble and disassemble the removable hard top with one user. To assemble the removable hard top a user must position the assembly pieces as described above and illustrated in the figures and secure pieces in place. Lock pins 41 are inserted into each designated lock pin hole 43 and locked into corresponding lock pin mechanisms 42. Lock pins 41 are inserted from the inside of the vehicle, for example driver inserts or removes the lock pins for the top front driver panel 10*a* while sitting in the driver seat. A user may fully assemble the hard top, by first securing rear assembly 12 to the vehicle. Preferably side panels 40*a* and 40*b* are conveniently secured next with top panels 10*a* through 10*d* secured last. Top front and rear driver panels 10*a* and 10*d* are secured last and removed first due to the shape of lap joint made with top front and rear passenger panels 10*b* and 10*c*. The order of assembly may vary depending on preferred configuration of the user.

All pieces have a thin weather stripping along each joint surface or surface that makes contact with another surface to provide a seal against outside elements.

Materials for the top panels are preferably a fiberglass or molded polymer material having a foam core. They may also be thermoplastic injected with a foam. The material is waterproof and therefore able to shield the vehicle occupants from inclement weather. Some of the adapter kit pieces may be a fiberglass or molded polymer having a wooden core for additional strength. The top panels may be formed by thermoforming or vacuum forming or other processes known to the art. The weight of each top panel is about 4-6 pounds if fiberglass and less if thermoplastic. It is estimated that the total weight of the hard top assembly is from about 30 to 50 pounds. For a two-door hard top assembly, the weight is about 30 to 40 pounds and for a four door hard top assembly about 40 to 50 pounds.

Preferably the window pane of side panels is made of a Lexan® brand polycarbonate, or other materials with similar properties.

Fasteners may be bolts with locknuts/washers (preferably for securing bottom members to tubrails, or cross member to front members, ball lock pins or thumbscrews (panels to panels), or a quick release gas assisted hinge for removable rear glass. The roll cage brackets may be secured to vehicle with original equipment manufacturer (OEM) thumbscrews. For example, the manufacturer of JEEP® brand 1997 to 2011 year vehicles provides OEM thumbscrews to secure soft tops provided with the vehicle. Thumbscrews may also be provided with the kit of the invention.

I claim:

1. A roof assembly system for a convertible sport utility vehicle, comprising:
   an adapter kit for semi-permanent installation on said sport utility vehicle having:
   (1) a horizontal left front member with a first attachment bracket secured along the length of said horizontal left front member,
   (2) a horizontal right front member with a second attachment bracket secured along the length of said horizontal right front member, said horizontal left front member and said horizontal right front member being positioned essentially parallel to each other;
   (3) a first horizontal cross member secured to one end of said horizontal left front member and secured to one end of said horizontal right front member, said horizontal cross member extending perpendicular to the length of said horizontal left front member and said horizontal right front member,
   (4) a vertical left side member coupled to one end of said horizontal left front member and coupled to one end of said horizontal cross member, said vertical left side member extending in a vertical perpendicular direction from the length of said horizontal left front member,
   (5) a vertical right side member coupled to one end of said horizontal right front member and coupled to one end of said horizontal cross member, said vertical right side member extending in a vertical perpendicular direction from the length of said horizontal right front member, said vertical left side member and said vertical right side member being positioned essentially parallel to each other;
   (6) a horizontal left bottom member coupled to one end of said vertical left side member, said horizontal left bottom member extending perpendicular to said vertical left side member and being positioned essentially parallel to said horizontal left front member;
   (7) a horizontal right bottom member coupled to one end of said vertical right side member, said horizontal right bottom member extending perpendicular to said vertical right side member and being positioned essentially parallel to said horizontal right front member, said horizontal left bottom member and said horizontal right front member being positioned essentially parallel to each other;
   and,
   a removable hard top assembly which secures to said adapter kit and said vehicle in use to form a hard top cover for said vehicle which may be disassembled for storage in said vehicle having:
   (1) a left front horizontal top panel secured with fasteners to said horizontal left front member and said horizontal cross member,
   (2) a right front horizontal top panel secured with fasteners to said horizontal right front member and said horizontal cross member,
   (3) a vertical left side panel secured to said vertical left side member and said horizontal left bottom member of said adapter with fasteners,
   (4) a vertical right side panel secured to said vertical right side member and said horizontal right bottom member of said adapter with fasteners;
   (5) a vertical left cabinet secured to said horizontal left bottom member,
   (6) a vertical right cabinet secured with fasteners to said horizontal right bottom member,
   (7) a horizontal rear cross-piece connected to the top of said left vertical cabinet and the top of said right vertical cabinet,
   (8) a vertical rear access panel coupled to said horizontal cross-piece,
   (9) a rear left top panel coupled to said vertical left side panel and said left vertical cabinet, and
   (10) a right rear top panel coupled to said vertical right side panel and said right vertical cabinet.

2. The system of claim 1, wherein said top front panels have a top side and a bottom side and said bottom side defines a channel which engages with the top of the windshield frame of said vehicle in use.

3. The system of claim 1, wherein said hard top assembly comprises a plurality of parts which secure to said adapter kit with fasteners which may be engaged and disengaged by a user from inside the vehicle.

4. The system of claim 1, wherein said fasteners are lock pins.

5. The system of claim 1, wherein said rear assembly horizontal cross piece has hinges connecting said horizontal cross piece to said vertical rear access panel to allow access to the vehicle interior.

6. The system of claim 1, wherein said removable hard top assembly is sufficiently compact so as to be fully storable inside the vehicle when disassembled.

7. The system of claim 1, wherein:
each of said top front panels has an edge that couples to the windshield of said vehicle, an edge that couples with one of said horizontal front members, an edge that couples with the other said top front panel and an edge that couples with the first horizontal cross member.

8. An adapter kit for a convertible hard top roof assembly for semi-permanent installation on a sport utility vehicle, comprising:
(1) a horizontal left front member with a first attachment bracket secured along the length of said horizontal left front member, said horizontal left front member having fastener holes;
(2) a horizontal right front member with a second attachment bracket secured along the length of said horizontal right front member said horizontal right front member having fastener holes, said horizontal left front member and said horizontal right front member being positioned essentially parallel to each other;
(3) a first horizontal cross member secured to one end of said horizontal left front member and secured to one end of said horizontal right front member extending perpendicular to the length of said horizontal left front member and said horizontal right front member when attached to vehicle, said first horizontal cross member having fastener holes;
(4) a horizontal left back member having a third attachment bracket secured along the length of said horizontal left back member, said horizontal left back member having fastener holes;
(5) a horizontal right back member having a fourth attachment bracket secured along the length of said horizontal right back member said horizontal right back member having fastener holes, said horizontal left back member and said horizontal right back member being attached to a vehicle essentially parallel to each other; and
(6) a second horizontal cross member securable to one end of said horizontal left back member and to one end of said horizontal right back member extending perpendicular to the length of said horizontal left back member and said horizontal right back member when attached to vehicle, said second horizontal cross member having fastener holes;
(7) a vertical left side member with the top of said vertical left side member being coupled to one end of said horizontal left back member, said vertical left side member being positioned in a vertical perpendicular direction compared to the length of said horizontal left back member, said vertical left side member having fastener holes;
(8) a vertical right side member with the top of said vertical right side member being coupled to one end of said horizontal right back member, said vertical right side member being positioned in a vertical perpendicular direction compared to the length of said horizontal right back member, said vertical right side member having fastener holes, said vertical left side member and said vertical right side member being positioned essentially parallel to each other;
(9) a horizontal left bottom member securable to one end of said vertical left side member having fastener holes, said horizontal left bottom member extending perpendicular to said vertical left side member and being positioned essentially parallel to said horizontal left front member; and
(10) a horizontal right bottom member securable to one end of said vertical right side member having fastener holes, said horizontal right bottom member extending perpendicular to said vertical right side member and being positioned essentially parallel to said horizontal right front member, said horizontal left bottom member and said horizontal right front member being attached to a vehicle essentially parallel to each other.

9. The adapter kit of claim 8, wherein said convertible hard top assembly is sufficiently compact so as to be fully storable inside the vehicle when disassembled.

10. The adapter kit of claim 8, wherein said convertible hard top assembly comprises a plurality of parts which secure to said adapter kit with fasteners which may be engaged and disengaged by a user from inside the vehicle.

11. The adapter kit of claim 10, wherein said fasteners are lock pins.

12. The adapter kit of claim 8, wherein said convertible hard top assembly has six top panels, two side panels and a rear assembly.

13. The adapter kit of claim 12 wherein said top panels comprise two top front panels, two top center panels, and two top rear panels.

14. The adapter kit of claim 13, wherein said top front panels have a top side and a bottom side and said bottom side defines a channel which engages with the top of the windshield frame of said vehicle in use.

15. The adapter kit of claim 12, wherein said rear assembly has a horizontal cross piece, a left vertical cabinet, a right vertical cabinet, and a rear access panel.

16. The adapter kit of claim 15, wherein said rear assembly horizontal cross piece has hinges connecting said horizontal cross piece to said vertical rear access panel to allow access to the vehicle interior.

17. A method of assembling a convertible hard top on a sport utility vehicle comprising:
providing a horizontal left front member with a first attachment bracket secured along the length of said horizontal left front member,
providing a horizontal right front member with a second attachment bracket secured along the length of said horizontal right front member, said horizontal left front member and said horizontal right front member being positioned essentially parallel to each other;
providing a first horizontal cross member secured to one end of said horizontal left front member and secured to one end of said horizontal right front member, said horizontal cross member extending perpendicular to the length of said horizontal left front member and said horizontal right front member,
providing a vertical left side member coupled to one end of said horizontal left front member and coupled to one end of said horizontal cross member, said vertical left side member extending in a vertical perpendicular direction from the length of said horizontal left front member,
providing a vertical right side member coupled to one end of said horizontal right front member and coupled to one end of said horizontal cross member, said vertical right side member extending in a vertical perpendicular direction from the length of said horizontal right front member, said vertical left side member and said vertical right side member being positioned essentially parallel to each other;

providing a horizontal left bottom member coupled to one end of said vertical left side member, said horizontal left bottom member extending perpendicular to said vertical left side member and being positioned essentially parallel to said horizontal left front member;

providing a horizontal right bottom member coupled to one end of said vertical right side member, said horizontal right bottom member extending perpendicular to said vertical right side member and being positioned essentially parallel to said horizontal right front member, said horizontal left bottom member and said horizontal right front member being positioned essentially parallel to each other;

providing a convertible hard top assembly which secures to said vehicle in use to form a hard top cover for said vehicle which may be disassembled for storage in said vehicle, said convertible hard top assembly having one or more horizontal top panels, a vertical left side panel, a vertical right panel, and a rear assembly having a horizontal cross piece, a left vertical cabinet, a right vertical cabinet and a rear access panel;

securing said horizontal left front member to said vehicle through said first attachment bracket secured along the length of said horizontal left front member, said horizontal left front member having fastener holes;

securing said horizontal right front member to said vehicle through said second attachment bracket secured along the length of said horizontal right front member, with said horizontal right front member having fastener holes; said horizontal left front member and said horizontal right front member being attached to a vehicle essentially parallel to each other;

securing said first horizontal cross member to said vehicle by coupling to one end of said horizontal left front member and to one end of said horizontal right front member, said first horizontal cross member extending perpendicular to the length of said horizontal left front member and said horizontal right front member, said first horizontal cross member having fastener holes;

securing said vertical left side member to said vehicle by coupling to one end of said horizontal left front member, said vertical left side member positioned in a vertical perpendicular relation to the length of said horizontal left front member, said vertical left side member having fastener holes;

securing said vertical right side member to said vehicle by coupling to one end of said horizontal right front member, said vertical right side member being positioned in a vertical perpendicular relation to the length of said horizontal right front member, said vertical right side member having fastener holes and attaching said vertical left side member and said vertical right side member to a vehicle adapter kit essentially parallel to each other;

securing said horizontal left bottom member to one end of said vertical left side member having, said horizontal left bottom member extending perpendicular to said vertical left side member and essentially parallel to said horizontal left front member; securing a horizontal right bottom member to one end of said vertical right side member, said horizontal right bottom member extending perpendicular to said vertical right side member and essentially parallel to said horizontal right front member, attaching said horizontal left bottom member and said horizontal right front member to said vehicle essentially parallel to each other;

securing said one or more horizontal top panels with fasteners at said fastener holes to said horizontal left front member, said horizontal right front member, said horizontal cross member and combinations thereof;

securing said vertical left side panel to said vertical left side member and said horizontal left bottom member with fasteners at said fastener holes;

securing said vertical right side panel to said vertical right side member and said horizontal right bottom member with fasteners at said fastener holes;

securing said vertical left cabinet through fasteners at said fastener holes to said horizontal left bottom member;

securing said vertical right cabinet with fasteners at said fastener holes to said horizontal right bottom member;

securing said horizontal rear cross-piece extending perpendicular to the top of said left vertical cabinet and said right vertical cabinet to said vertical left cabinet, said vertical right cabinet and to one or more of said top panels, securing a vertical rear access panel securable to horizontal cross-piece; and, securing said one or more top panels, said vertical left side panel, said vertical right side panel, said rear assembly or combinations thereof with fasteners which engage with said fastener holes.

18. The method of claim 17, wherein said top front panels have a top side and a bottom side and said bottom side defines a channel which engages with the top of the windshield frame of said vehicle in use.

19. The method of claim 17, wherein said hard top assembly comprises a plurality of parts which secure with fasteners which may be engaged and disengaged by a user from inside the vehicle.

20. The method of claim 17 wherein said fasteners are lock pins.

21. The method of claim 17, wherein said rear assembly horizontal cross piece has hinges connecting said horizontal cross piece to said vertical rear access panel to allow access to the vehicle interior.

22. The system of claim 17, wherein said removable hard top assembly is sufficiently compact so as to be fully storable inside the vehicle when disassembled.

\* \* \* \* \*